United States Patent
Shin et al.

(10) Patent No.: US 7,881,179 B2
(45) Date of Patent: Feb. 1, 2011

(54) SYSTEMS AND METHODS FOR RECORDING OPTICAL INFORMATION

(75) Inventors: Kuo-Ding Shin, Hsinchu County (TW); Kun-Hung Hsieh, Hsinchu County (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 12/700,077

(22) Filed: Feb. 4, 2010

(65) Prior Publication Data

US 2010/0135134 A1    Jun. 3, 2010

Related U.S. Application Data

(63) Continuation of application No. 12/164,537, filed on Jun. 30, 2008, now Pat. No. 7,684,308, which is a continuation of application No. 11/091,042, filed on Mar. 28, 2005, now Pat. No. 7,411,890.

(51) Int. Cl.
    *G11B 7/24* (2006.01)
(52) U.S. Cl. .................. 369/275.4; 369/100; 369/53.17
(58) Field of Classification Search ............. 369/275.3, 369/275.4, 53.17, 100, 53.2, 47.22, 47.5, 369/59.25, 47.3
See application file for complete search history.

(56) References Cited

U.S. PATENT DOCUMENTS

| 6,373,805 | B1 | 4/2002 | Song |
| 6,421,308 | B1 | 7/2002 | Kizu et al. |
| 7,379,401 | B2 * | 5/2008 | Wu et al. .................. 369/47.3 |
| 7,411,890 | B2 | 8/2008 | Shin |
| 2004/0109398 | A1 | 6/2004 | Wu |

FOREIGN PATENT DOCUMENTS

TW      460873 B      10/2001

OTHER PUBLICATIONS

English abstract of TW460873, pub. Oct. 21, 2001.

* cited by examiner

*Primary Examiner*—Ali Neyzari
(74) *Attorney, Agent, or Firm*—Thomas, Kayden, Horstemeyer & Risley

(57) ABSTRACT

A system controlling recording on an optical disc is provided. A first counter performs a bit count according to provided channel bit clock signals. A second counter performs a sector count responsive to the bit count obtained by the first counter. The Land/Groove switch predicts machine uses the result of bit count and sector count to predict the land/groove switch point. The processor uses the physical ID (PID) to determine the track type of a sector at which a recording operation initiates. The power controller determines a recording power for the recording operation according to the Land/Groove switch predict machine.

19 Claims, 7 Drawing Sheets

SYSTEMS AND METHODS FOR RECORDING OPTICAL INFORMATION

CROSS REFERENCE TO RELATED APPLICATIONS

This application is a Continuation of U.S. patent application Ser. No. 12/164,537, filed on Jun. 30, 2008, which is a Continuation of U.S. patent application Ser. No. 11/091,042, filed on Mar. 28, 2005 (now U.S. Pat. No. 7,411,890), the contents of which are incorporated herein by reference.

BACKGROUND

The invention relates to data recording, and more particularly to control of recording power when recording information to alternating land/groove tracks on an optical disc.

In conventional phase-change optical discs, data is typically recorded on groove tracks. When data is recorded on groove tracks, land tracks guide laser beams and reduce crosstalk from adjacent groove tracks.

If data is recorded on both groove tracks and land tracks, density of data tracks may be doubled provided that the widths of the groove and land tracks are unchanged. Crosstalk between adjacent land and groove tracks may be reduced if the height differences between the land and groove tracks is ⅙ λ (wavelength of light source). Therefore, using both groove and land tracks is feasible to attain higher recording density. Accordingly, optical discs utilizing land/groove configuration such as DVD-RAM (digital versatile disc-random access memory) are developed, as well as opto-magnetic recording media such as ASMO (Advanced Storage Magneto-Optical) discs.

FIG. 1 illustrates configuration of a conventional optical disc comprising alternating land and groove tracks. As illustrated, the optical disk 10 is of a single-spiral configuration, in which groove track 11 and land track 13 are switched at header 151, and groove track 11 and land track 13 alternate along a single continuous spiral track. Each of the tracks is divided into a plurality of sectors 153 by the header 151 at the switch point and header 152 elsewhere in each revolution. In the illustrated example, there are 8 sectors per revolution, while in an actual design of an optical disc, there may be tens of sectors per revolution, and the number of sectors increases in the outer annular area.

FIG. 2 is a cross section of the described optical discs. Optical disc 20 comprises a plurality of alternating land tracks 22 and groove tracks 24. According to a conventional land/groove recording method, the same power level is used for recording data on the land and groove tracks, assuming that recording condition is the same for the land and groove tracks. Owing to the structural differences, however, the land and groove tracks have different recording conditions. Therefore, when recording on the land and groove tracks, a light beam of the same power may generate recording marks of different lengths on the land and groove tracks, respectively. As a result, bit error rate on groove and/or land track may increase. When recording information on both the land and groove tracks, recording power changes when recording track switches from a land track to a groove track, and vise versa.

According to a conventional method, when recording, intensity of light beams differs on land tracks and groove tracks. Type of data track is determined using information recorded on header field accompanied with each sector. For example, physical ID (PID) within the header field may be used to determine whether the data track is a land or groove track. Additionally, the data track type may be determined using signals obtained from a preamplifier. These conventional methods, however, are error-prone, especially under situations of high noise or high rotation speed.

SUMMARY

The present invention uses a predict mechanism to determine land/groove track switch, and determine a write power accordingly. According to the predict mechanism, a counter mode is initiated after one or more physical identification number(s) (PID) is (are) retrieved. In the counter mode, a land/groove switch point may be predicted, and write power is changed at the predicted land/groove switch point. According to a conventional method, when the PID is not obtained from the header information, the land/groove track switch point cannot be determined for lack of sector type information provided by the PID. The present invention, however, can correctly predict the land/groove track switch point even though the PID is not available for some time.

The invention relates to methods and systems for recording information on an optically readable storage media (referred to as "optical disc" hereinafter), predict the position of land/groove alternation of a disc formatted to accommodate advanced high-density information storage techniques, such as DVD-RAM.

Systems for recording and controlling recording on optical discs are provided. In an embodiment, a system for controlling recording on an optical disc is provided, wherein the optical disc comprises alternating land and groove tracks, each of which comprises a plurality of sectors identified by physical ID (PID). The system comprises a first counter, second counter, Land/Groove switch predict machine, processor, and a power controller. The first counter performs a bit count according to provided channel bit clock signals. The second counter performs a sector count responsive to the bit count obtained by the first counter. The Land/Groove switch predicts machine uses the result of bit count and sector count to predict the land/groove switch point. The processor uses the physical ID (PID) to determine the track type of a sector at which a recording operation initiates. The power controller determines a recording power for the recording operation according to the Land/Groove switch predict machine.

Also disclosed are systems for recording information on optical discs. The system records information on an optical disc having a track with alternate formation of a plurality of land and groove tracks therein, wherein each of the tracks comprises a plurality of sectors identified by physical ID (PID) thereof. The system comprises an optical head, a detector, and a controller. The optical head provides light to the optical disc, receives reflected light from the optical disc, and provides signals according to the reflected light. The detector decodes the physical ID (PID) from the signals provided by the optical head. The controller performs a bit count according to provided channel bit clock signals, performs a sector count in response to the bit count, determines the track type of a sector at which the recording operation initiates according to the physical ID (PID), uses the bit count to determine whether the recording operation proceeds to a following sector, and determines the position of the sector relative to a preset switch point where the land and groove track alternate according to the sector count, and predict the land/groove switch point using the result of sector count.

Also disclosed are methods of recording information. In an embodiment of such a method, an optical disc is provided, wherein the optical disc comprises alternating land and groove tracks arranged according to a preset configuration, and each track comprises a plurality of sectors. Physical ID (PID) is provided, specifying a serial number of a sector to which data is recorded. The track type of the sector is determined according to the physical ID (PID) and the preset configuration. A counter mode is initiated after one or more physical identification number(s) (PID) is (are) retrieved. In the counter mode, a land/groove switch point may be predicted, and write power is changed at the predicted land/groove switch point.

DESCRIPTION OF THE DRAWINGS

The invention can be more fully understood by reading the subsequent detailed description and examples with references made to the accompanying drawings, wherein.

DETAILED DESCRIPTION

Exemplary embodiments of the invention will now be described with reference to FIGS. 3 through 7, applied here to adjustment of power level of light beams when recording on an optical disc configured according to DVD-RAM technique. While some embodiments of the invention are applied with DVD-RAM, it is understood that other storage media recording data on alternating land and groove tracks may be readily substituted.

In the following detailed description, reference is made to the accompanying drawings which form a part hereof, and in which is shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense. The leading digit(s) of reference numbers appearing in the Figures corresponds to the Figure number, with the exception that the same reference number is used throughout to refer to an identical component which appears in multiple figures.

Figure 1:
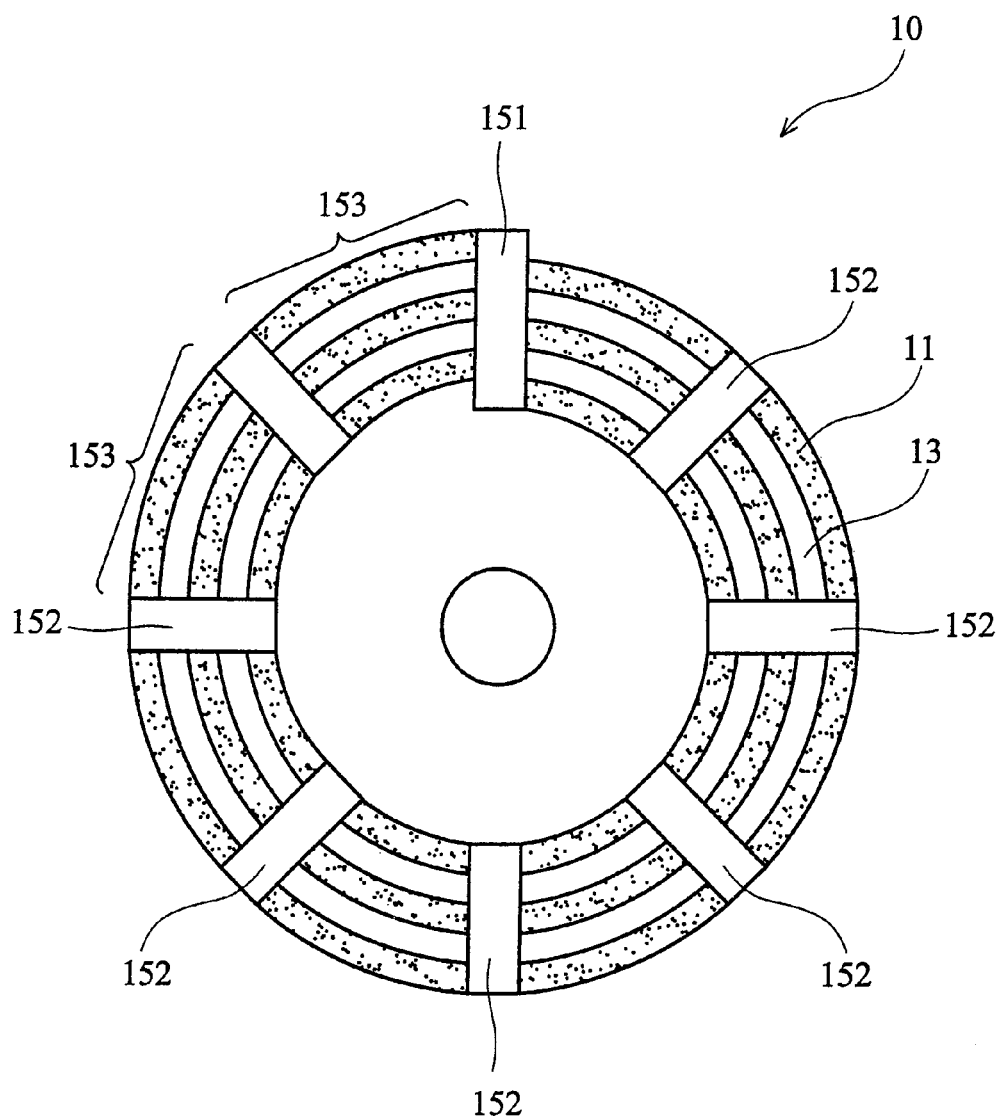
FIG. 1 illustrates configuration of a conventional optical disc comprising alternating land and groove tracks.
Figure 2:
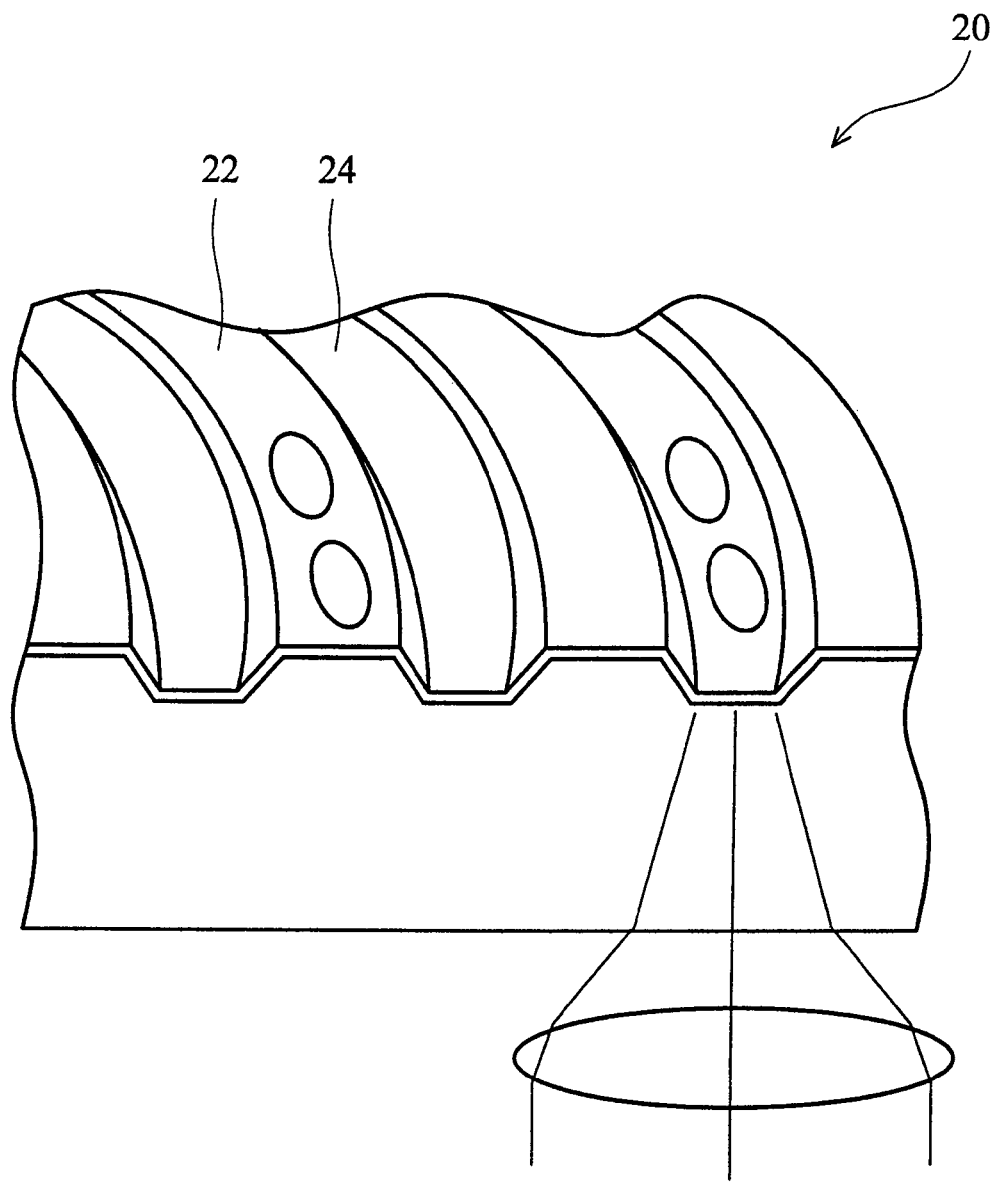
FIG. 2 is a cross section of a conventional optical disc.
Figure 3:
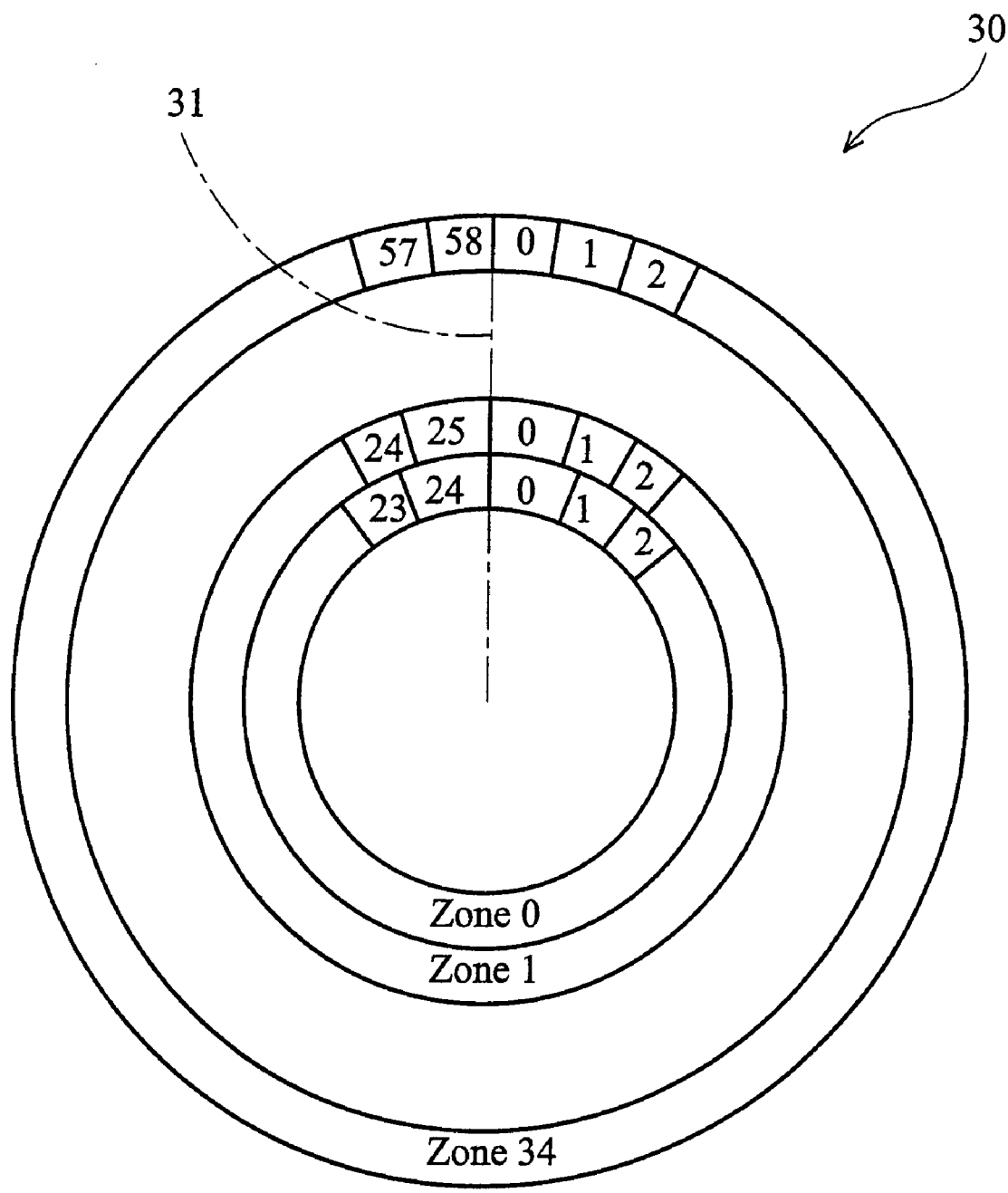
FIG. 3 is a schematic diagram showing an optical disc for use in an embodiment of the invention.

FIG. 3 is a schematic diagram showing an optical disc 30 for use in an embodiment of the invention. As shown in FIG. 3, optical disc 30 comprises in its data recording area a track (not shown), extending from the inner annular area to the outer annular area. The track comprises land and groove track segments alternating per revolution at a preset switch line 31. Here, the data recording area of optical disc 30 is divided into 35 annular zones (zone 0~34), each of which comprises several track revolutions, each track revolution further partitioned into a plurality of sectors. For zone 0~33, each zone comprises 1568 track revolutions. Zone 34 comprises 1792 track revolutions. The number of sectors per revolution differs in each zone. For example, there are 25 sectors per revolution in zone 0. For zone X, the number of sector per revolution is "25+X". Therefore, the number of sectors increases from 25 (for zone 0) to 59 (for zone 34). Each zone starts its first revolution in a groove track.

Figure 4:
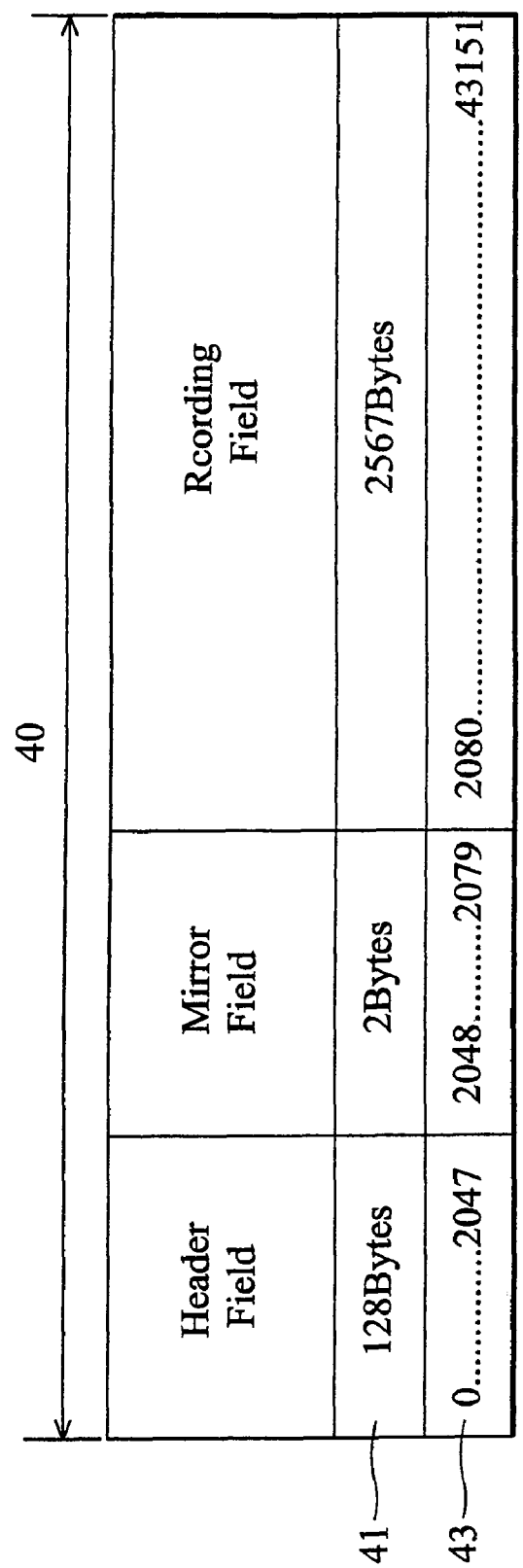
FIG. 4 is a schematic diagram showing a sector for recording data on the optical disc of FIG. 3.
Figure 5:
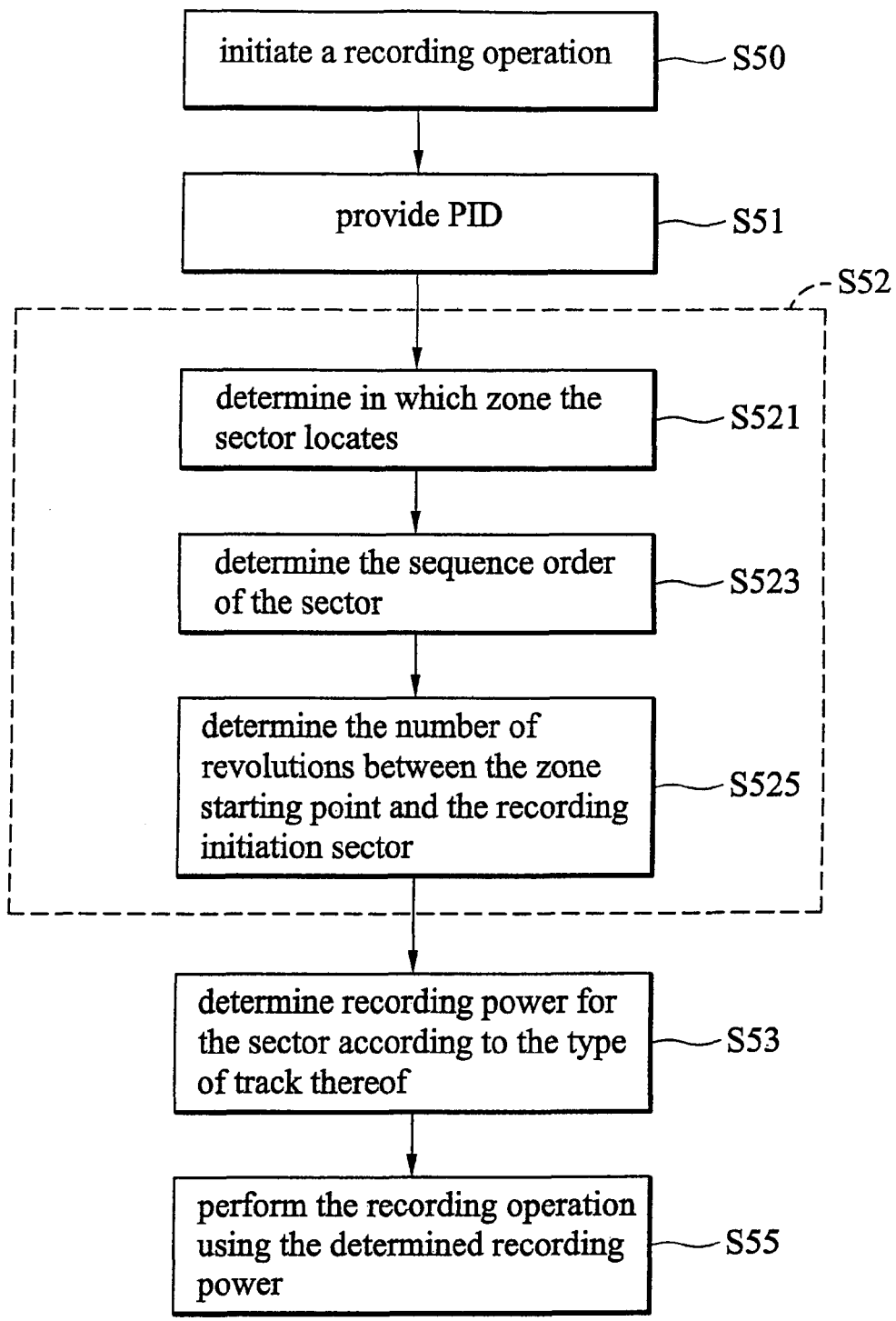
FIG. 5 is a flowchart of an embodiment of a method of determining initial recording power level when recording data on the optical disc of FIG. 3.

FIG. 4 is a schematic diagram showing a sector 40 for recording data. As described above, in an optical disc formatted according to the DVD-RAM technique, a sector is a basic unit for data recording. Sector 40 is divided into a header field, mirror field, and a recording field. Row 41 comprises a number of data bits for the header, mirror, and recording fields, respectively. Row 43 comprises a number of channel bits for the header, mirror, and recording fields, respectively. The header field comprises 128 Bytes of data, including physical identification information (PID). The mirror field comprises 2 Bytes of data. The recording field comprises 2567 Bytes of data, including user data. After an 8/16 modulation process, data bits in the header, mirror, and recording fields are converted to 2048, 32, and 41072 channel bits, respectively. FIG. 5 is a flowchart of an embodiment of a method of recording data on the optical disc of FIG. 3. A recording operation is initiated (step S50). Physical ID (PID) is provided, specifying a serial number of a sector at which the recording operation is initiated (step S51). For example, the recording operation can be set to initiate at a sector identified with a physical ID (PID) 0x40767.

The location of the sector is then determined according to the physical ID (PID) thereof and the configuration of the optical disc (step S52). In step S521, it is determined in which zone the sector is located. Sectors associated with physical ID (PID) 0x39920~0x4385F are located in zone 1. Accordingly, sector numbered 0x40767 is located in zone 1. In step S523, the sequence order of the sector 0x40767 within zone 1 is determined. Zone 1 starts at sector 0x39920 and ends at sector 0x4385F. The sector 0x40767 is the $28231^{th}$ (0x6E47) sector of zone 1, calculated by subtracting 0x39920 from 0x40767 (0x40767-0x39920). In step S525, the number of revolutions between the zone starting point and the recording initiation sector is determined. Accordingly, it is determined whether the sector is located in a land or groove track. Every revolution in zone 1 has 26 sectors (0 to 25). Accordingly, the $28231^{th}$ (0x6E47) sector is located in the $1085^{th}$ revolution of zone 1, calculated by dividing 28231 by 26, obtaining a quotient 1085 and a remainder 21. All of zones 0~34 start at groove tracks. Accordingly, the $1085^{th}$ revolution of zone 1 is a land track. Additionally, the remainder 21 obtained in the calculation in step S525 indicates that the sector $28231^{th}$ (0x6E47) is the $21^{th}$ sector after a switch point preceding the $1085^{th}$ revolution of zone 1. In step S53, recording power for the sector is determined according to the type of track thereof. Here, a recording power corresponding to a land track is determined. In step S55, the recording operation is performed using the determined recording power.

Figure 6:
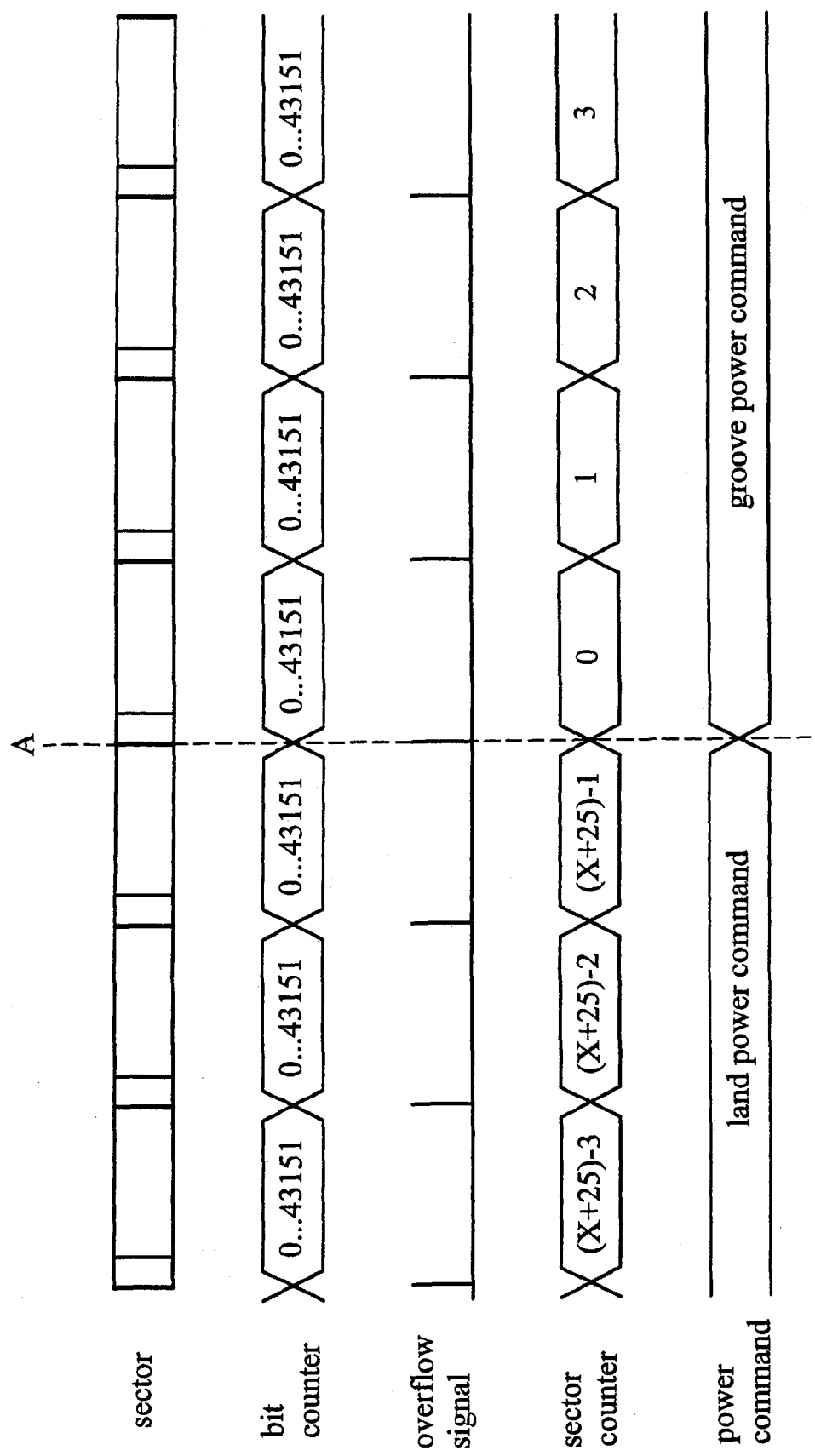
FIG. 6 is a schematic view of operation of generating power switch signals when recording data on the optical disc of FIG. 3.

FIG. 6 is a schematic view of the operation of controlling recording power during a recording operation. The land and groove tracks alternate per revolution, with the recording power changing per revolution accordingly. When a recording operation is initiated, physical ID (PID) is provided, specifying a serial number of a sector in which the recording operation is initiated. The zone number at which the sector is located is determined according to the physical ID (PID) using the method of FIG. 5. The sequence of the sector of the zone is also determined. For example, if the serial number of the sector is 0x40767, $28231^{th}$ sector of zone 1, upon initiation of the recording operation, bit and sector counters are initiated according to the physical ID (PID). The sector counter is initiated at 21. The bit counter is initiated at 0, indicating the recording operation starts at the beginning of the header of the sector 0x40767.

As the recording operation proceeds, bit and sector counters are initiated. The bit counter increases by 1 when the recording operation precedes one channel bit. Each sector comprises 43152 channel bits, corresponding to channel bit counts 0~43151. Accordingly, when the bit count reaches 43151, an overflow signal is generated, directing the sector count to increase by 1. If the sector count reaches the largest sector number of the corresponding zone, the next sector count is reset to zero while an overflow signal is generated by bit counter, and a power switch signal is generated to change the recording power corresponding to a track type switch. Using the recording operation initiating at physical ID (PID) 0x40767 as an example, the sector locates on a land track of zone 1, which comprises sector 0~25. During recording, if the sector count reaches 25, the next sector count is reset to zero while an overflow signal is generated by bit counter, and a power switch signal is generated to change the recording power from a land track level to a groove track level.

The method also provides a calibration process to maintain according to the bit and sector counts. As shown in FIG. 5, the header field comprises 128 Bytes of data, including prerecorded physical identification information (PID). Typically, a header field comprises 4 PIDs, each of which comprises a number specifying a preset number of channel bit count corresponding to a particular point within the header field. When one of the four PID is read during a recording process, the number retrieved therefrom is sent to the bit counter to calibrate the channel bit count thereof. In other words, the bit count is reloaded when a PID is retrieved, and the bit count calibrated thereby.

Figure 7:
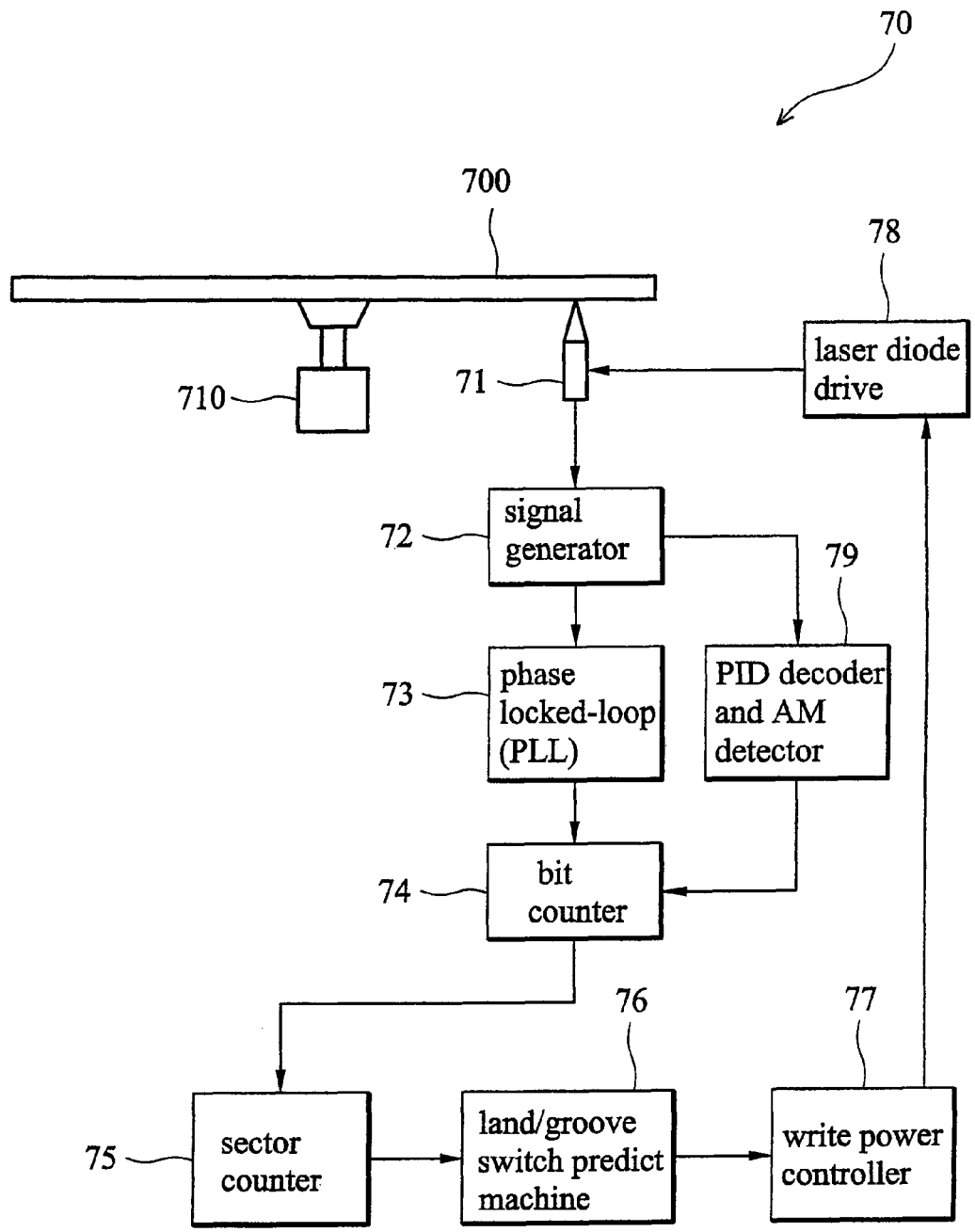
FIG. 7 is a schematic view of an embodiment of a system for data recording.

FIG. 7 is a schematic view of an embodiment of a system for data recording. System 70 records data by writing marks to a recording surface of an optical disc 700, and reproduces data therefrom. The optical disc 700 may be disk-shaped optical data storage medium, such as a DVD-RAM, comprising alternating land and groove tracks. System 70 comprises optical pickup 71, signal generator 72, phase locked-loop (PLL) 73, bit counter 74, sector counter 75, land/groove switch predict machine 76, write power controller 77, spindle motor 710, laser diode drive 78, and PID decoder and address mark (AM)detector 79. The optical disc 700 is driven by a spindle motor 710 to rotate at a preset programmable speed. Light reflected from optical disc 700 is received by optical pickup 71. The optical pickup 71 has several built-in parts or components, comprising a semiconductor laser device, optical parts for light collection or focusing a laser beam onto the information recording layer of the optical disc 700, a photodetector for detecting reflected light, an actuator for rendering the beam focus position variable, and others. Signal generator 72 converts the photo-currents output from the optical pickup 71 into voltage signals. PLL 73 generates channel bit clock signals in response to the voltage signals transmitted from the signal generator 72. The bit counter 74 performs a channel bit count according to the clock signals generated by PLL 73. The PID decoder and AM detector 79 receive signals generated from the header field, decode a PID from the signals, and determine whether an AM is detected. When a PID and/or an AM is decoded and detected, the bit counter 74 is calibrated according to the PID and/or AM. The calibration process corrects a count error caused by a PLL error and/or spindle motor instability, thus ensuring accuracy of the bit counter 74. During recording, the bit counter 74 performs a channel bit count. The bit counter 74 increases by 1 when the recording operation precedes one channel bit. Each sector comprises 43152 channel bits, corresponding to channel bit counts 0.about.43151. Accordingly, when the channel bit count reaches 43151, a bit count overflow signal is generated by the bit counter 74, directing a sector counter 75 to increase by 1. If the sector count reaches the last sector number of the corresponding zone, the next sector count is reset to zero while an overflow signal is generated by bit counter, and the land/groove switch predict machine 76 predict whether the following sector locates in a land track or groove track. A power switch signal is generated by the write power controller 77 according to the prediction result obtained by the land/groove switch predict machine 76, which receives the power switch signal and directs the laser diode drive 18 to change the recording power according to the track type. Using physical ID (PID) 0x40767 as an example, the sector is located on a land track of zone 1, which comprises sector 0.about.25. If the sector count reaches 25, the next sector count is reset to zero while an overflow signal is generated by bit counter, and a power switch signal is generated to change the recording power from a land track level to a groove track level.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A system for controlling recording or reproducing operation on an optical disc, the optical disc comprising a spiral formed of alternating land and groove revolutions, each land or groove revolution comprising a plurality of sectors, the system comprising:
   a counter generating a counting value according to a clock signal; and
   a Land/Groove switch predict machine predicting a switch point between a land revolution and a groove revolution according to the counting value.

2. The system of claim 1, wherein the Land/Groove switch predict machine further determines whether the recording or reproducing operation proceeds to a following sector.

3. The system of claim 1, further comprising a clock generator generating the clock signal.

4. The system of claim 1, further comprising a PID decoder and an address mark (AM) detector to calibrate the counting value.

5. The system of claim 1, further comprising a power controller determining a recording power for the recording operation according to the Land/Groove switch predict machine.

6. A system for performing a recording or reproducing operation on an optical disc, wherein the optical disc comprises a spiral formed of alternating land and groove revolutions, and each land or groove revolution comprises a plurality of sectors, comprising:
   a detector detecting a physical ID (PID) from signals generated according to reflected light from the optical disc; and
   a controller deriving a counting value according to a clock signal, and predicting a switch point between a land revolution and a groove revolution according to the counting value.

7. The system of claim 6, wherein the controller further determines whether the recording or reproducing operation proceeds to a following sector.

8. The system of claim 6, wherein the optical disc is a DVD-RAM.

9. The system of claim 6, further comprising a clock generator generating the clock signal.

10. The system of claim 6, further comprising a PID decoder and an address mark (AM) detector to calibrate the counting value.

11. A method for recording or reproducing operation on an optical disc, the optical disc comprises a spiral formed of alternating land and groove revolutions, each land or groove revolution comprises a plurality of sectors, the method comprising:
 providing a physical ID (PID) specifying a serial number of a sector; and
 predicting a switch point between a land revolution and a groove revolution according to a counting result.

12. The method of claim 11, further comprising using a counter to predict the switch point.

13. The method of claim 11, further comprising using a predicted result to determine a recording power for a recoding or reproducing operation performed on the sector according to a type of a track of the sector.

14. The method of claim 13, further comprising determining the type of the track of the sector by the physical ID.

15. The method of claim 11, further comprising predicting the number of sectors between a preceding switch point and a sector in which data is recorded or reproduced.

16. The method of claim 11, further comprising generating a channel bit count during the recording or reproducing operation.

17. The method of claim 16, further comprising resetting the channel bit count to zero when the channel bit count reaches a preset number.

18. The method of claim 11, further comprising generating a sector count during the recording or reproducing operation.

19. The method of claim 18, further comprising generating a power switch signal for the recording operation when the sector count reaches a preset number.

* * * * *